United States Patent
Grai et al.

(10) Patent No.: US 7,254,475 B1
(45) Date of Patent: Aug. 7, 2007

(54) DETECTION SYSTEMS AND METHODS

(75) Inventors: Tim Grai, Oxford, MI (US); Simon Brewerton, Trowbridge (GB); Patrick Leteinturier, Munich (DE)

(73) Assignees: Infineon Technologies AG, Munich (DE); Infineon Technologies UK Ltd., Bristol (GB)

( * ) Notice: Subject to any disclaimer, the term of this patent is extended or adjusted under 35 U.S.C. 154(b) by 0 days.

(21) Appl. No.: 11/348,847

(22) Filed: Feb. 7, 2006

(51) Int. Cl.
*G06F 19/00* (2006.01)
*F02P 5/00* (2006.01)

(52) U.S. Cl. .................................................. 701/111
(58) Field of Classification Search ................ 701/111, 701/102, 29, 31; 702/185, 189; 73/35.08
See application file for complete search history.

(56) References Cited

U.S. PATENT DOCUMENTS

| | | | | |
|---|---|---|---|---|
| 4,384,473 A | * | 5/1983 | Brandt | 73/35.06 |
| 4,637,245 A | * | 1/1987 | Iwata et al. | 73/35.03 |
| 5,339,245 A | * | 8/1994 | Hirata et al. | 701/111 |
| 6,456,927 B1 | | 9/2002 | Frankowski et al. | |
| 6,931,914 B2 | | 8/2005 | Dohi et al. | |
| 6,945,229 B1 | | 9/2005 | Zhu et al. | |
| 6,975,969 B2 | | 12/2005 | Sauler et al. | |

OTHER PUBLICATIONS

"Engine Knock Detection Using Spectral Analysis Techniques With a TMS320 DSP", Texas Instruments Application Report, Thomas G. Horner, Aug. 1995, 62 pgs.

* cited by examiner

*Primary Examiner*—Hieu T. Vo
(74) *Attorney, Agent, or Firm*—Eschweiler & Associates, LLC (57) ABSTRACT

One embodiment of the invention provides a detection system. The detection system includes an analog to digital converter that converts one or more analog vibration signals into one or more digital samples, a filter that analyzes at least a portion of the one or more digital samples and identifies energy values across a range of frequencies, a frequency selector that selects a subset of the frequencies for analysis according to one or more operational characteristics, and an analyzer that analyzes the subset of frequencies along with threshold values to identify one or more results.

36 Claims, 5 Drawing Sheets

FIG. 1

NORMAL COMBUSTION

FIG. 2A

KNOCK CONDITION

DETECTION SYSTEMS AND METHODS

BACKGROUND OF THE INVENTION

Control systems for combustion engines are generally designed to reduce exhaust emissions and increase power and fuel economy. The increase in power and fuel economy can be achieved through the use of a suitable spark timing for a given air/fuel ratio. However, any increase in power and fuel economy can be limited by engine knock.

Normal combustion occurs within an internal combustion engine when a gaseous mixture of air and fuel is ignited by a spark plug and burns smoothly from a point of ignition to the walls of the cylinders in the engine. Engine knock occurs when temperature and/or pressure in an unburned air/fuel mixture exceeds a critical level, thereby causing autoignition of the air/fuel mixture. A shockwave is produced as a result that generates a rapid increase in cylinder pressure. An impulse created by the shockwave excites a resonance in the cylinder at a characteristic frequency that is dependent on cylinder bore diameter, combustion chamber temperature, and the like. Pistons, rings, exhaust valves, and other components can be damaged if sustained knocking occurs. Fuel economy and power can also be degraded as a result. Furthermore, persons may find the sound from engine knock to be objectionable. To mitigate engine knock, the spark or ignition timing are adjusted when the engine knock occurs. The ignition timing is adjusted so that ignition occurs prior to or at the moment of autoignition from temperature and/or pressure conditions within the cylinder.

Sensors can be employed to detect engine knock in internal combustion engines. The sensors are used to monitor the combustion process and provide feedback to an engine controller. The sensors are typically mounted on the engine and monitor vibrations transmitted throughout the engine to detect the engine knock. Because the resonance or vibrations caused by engine knock yield a repeatable and identifiable frequency characteristic or spectral signature at a given operating condition, the sensors sense engine knock by identifying the spectral signature.

One type of sensor used for detecting engine knock is a tuned sensor that mechanically or electronically amplifies a magnitude of a signal in the frequency range of the knock-excited resonance. These types of sensors however must be unique to particular engine types due to anticipated frequency ranges of the spectral signature. Another type of sensor is a broadband sensor that has no resonant peaks below the 20-kHz operating range of a typical knock detection system. While broadband sensors can be used in a variety of engine types, postprocessing by a computer or microcontroller is typically required to identify a particular characteristic frequency.

Systems for knock detection typically use a fixed set of one or more filters to perform knock detection on signals received from sensors. Because the filters are usually tuned or adjusted for a particular engine type and range of operating conditions, engine operation outside of this range can result in degraded knock detection or engine failure.

SUMMARY OF THE INVENTION

One embodiment of the invention provides a detection system. The detection system includes an analog to digital converter that converts one or more analog vibration signals into one or more digital samples, a filter that analyzes at least a portion of the one or more digital samples and identifies energy values across a range of frequencies, a frequency selector that selects a subset of the frequencies for analysis according to one or more operational characteristics, and an analyzer that analyzes the subset of frequencies along with threshold values to identify one or more results.

DETAILED DESCRIPTION OF THE INVENTION

One or more implementations of the present invention will now be described with reference to the attached drawings, wherein like reference numerals are used to refer to like elements throughout.

Figure 1:
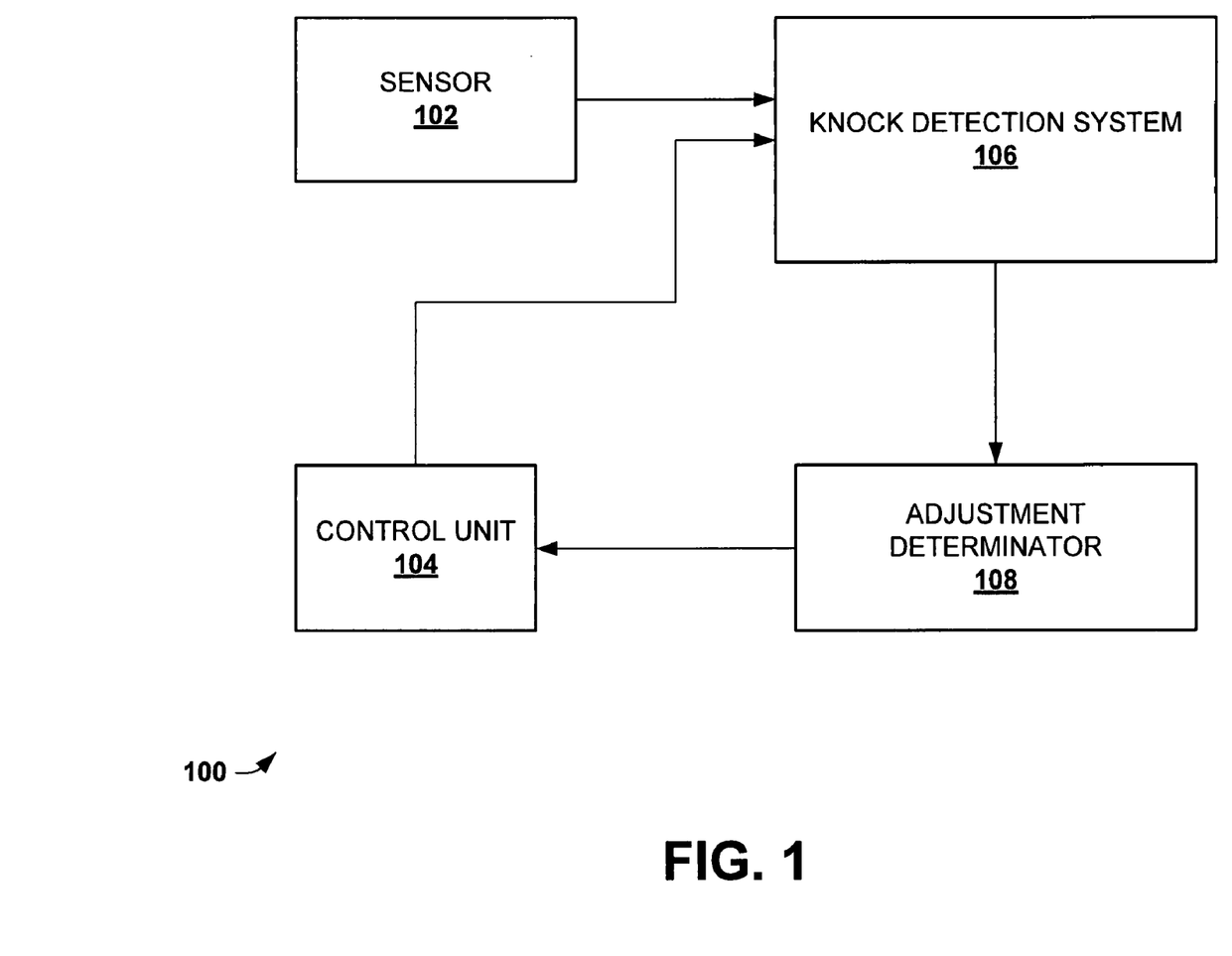
FIG. 1 is a block diagram of a system 100 employing a detection system in accordance with one embodiment of the invention.

FIG. 1 is a block diagram of a system 100 employing a detection system in accordance with one embodiment of the invention. While the embodiment illustrated in FIG. 1 includes a system 100 that can compensate for engine knock for a variety of operating conditions, in other embodiments, system 100 can compensate for other suitable variables in response to other suitable conditions.

In the illustrated embodiment, system 100 includes a sensor 102, a control unit 104, a detection system 106, and an adjustment determinator 108. Sensor 102 includes one or more vibration sensors that are typically mounted on an engine block. Sensor 102 converts detected vibrations into one or more analog vibration signals that are representative of the detected vibrations. In various embodiments, the sensor 102 detects vibrations for activity including, but not limited to, engine knock, engine crankshaft revolutions per minute and noise.

In the illustrated embodiment, control unit 104 controls the operation of one or more systems within a combustion system. In various embodiments, control unit 104 can control fuel injection, ignition timing, idle speed control, operation of air conditioning systems, fuel pump operation, and the like. In one embodiment, control unit 104 includes a microprocessor, random-access memory, read-only memory, and an input/output interface. In various embodiments, control unit 104 obtains operating characteristics from input sensors (not shown) that measure engine coolant temperature, barometric pressure, air flow, cam position synchronization, oxygen cylinder content or the combustion cycle window. In various embodiments, control unit 104 provides the operating characteristics to other suitable components within system 100.

In the illustrated embodiment, detection system 106 analyzes the vibration signal from sensor 102 and provides knock analysis results. In one embodiment, detection system 106 is comprised of a single circuit. In the illustrated embodiment, detection system 106 utilizes operating characteristics to identify engine knock. These operating characteristics can include, but are not limited to, engine speed, combustion cycle window, cam synchronization, the amount of air per cylinder, engine torque, engine age, the number of cylinders and the cylinder size. In the illustrated embodiment, detection system 106 employs filters to remove extraneous noise and other unwanted information from the vibration to analyze a knock window of the combustion cycle. The knock window is a portion of the combustion cycle in which ignition and knock are likely to occur. The filters (not shown) obtain energy values at various frequencies. In one embodiment, these frequencies are referred to as buckets. In the illustrated embodiment, the calculated energy values are converted into power and analyzed and compared to previous values. The results of this analysis identify engine knock and are provided as knock analysis results. In other embodiments, other suitable knock detection systems can be used.

In the illustrated embodiment, adjustment determinator 108 obtains knock analysis results from detection system 106 and provides engine adjustment information to control unit 104. In one embodiment, adjustment information includes ignition timing adjustments that can be used to mitigate future occurrences of engine knock. In one embodiment, determinator 108 is part of detection system 106. In the illustrated embodiment, control unit 104 employs the adjustment information to reduce or mitigate engine knock. In other embodiments, control unit 104 utilizes the adjustment information to perform other suitable tasks. In one embodiment, control unit 104 employs the adjustment information to adjust ignition timing.

Figure 2A:
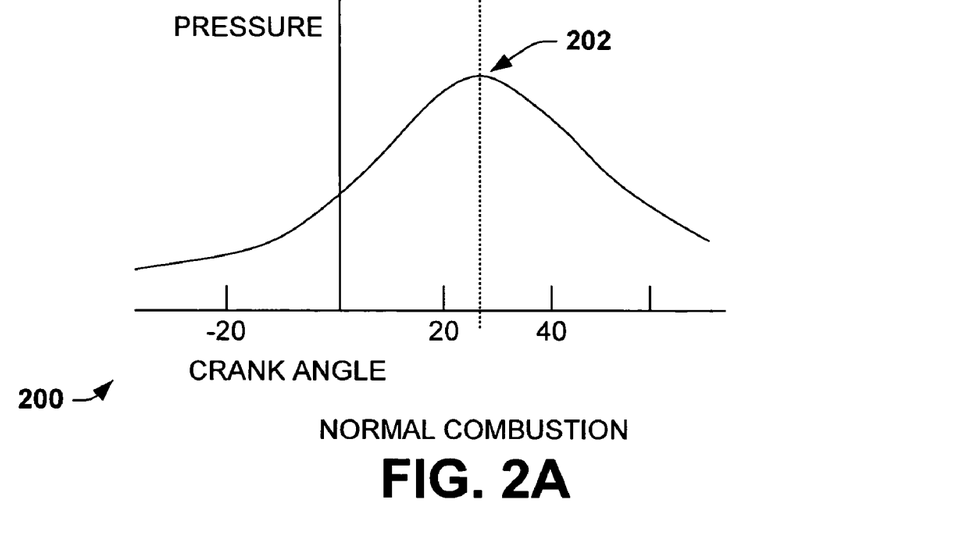
FIGS. 2A and 2B are graphs illustrating simulated knock detection with a knock detection system in accordance with one embodiment of the invention.

FIGS. 2A and 2B are graphs illustrating simulated knock detection within a knock detection system in accordance with one embodiment of the invention. A first graph 200 shown in FIG. 2A illustrates one embodiment of a normal or typical combustion cycle that does not include significant knock. A y-axis depicts pressure and an x-axis depicts crank angle. Ignition occurs at point 202 of the graph 200, which is also at the maximum pressure for the combustion cycle. The system 100 of FIG. 1 can be employed to analyze this combustion cycle to determine the absence of substantial knock.

Figure 2B:
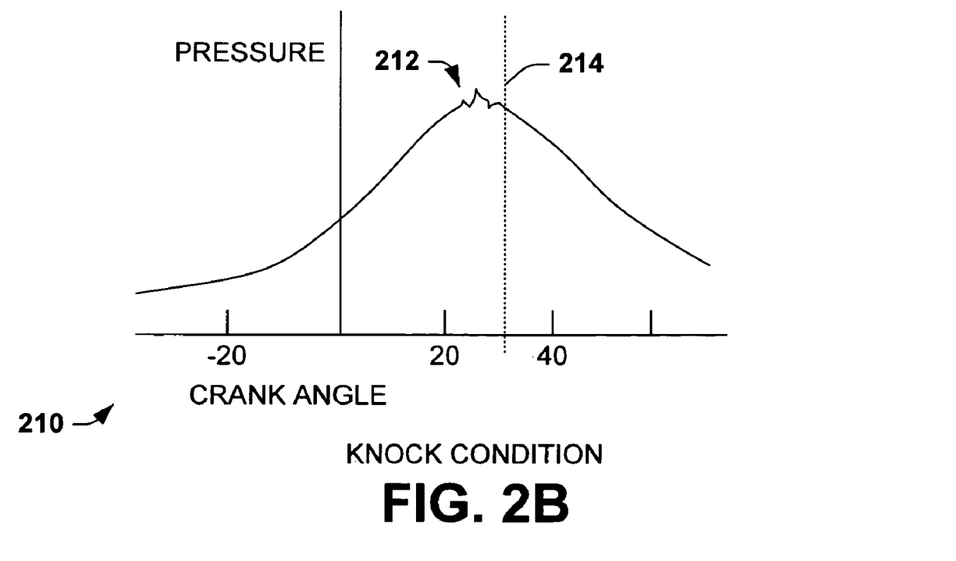

A second graph 210 shown in FIG. 2B illustrates one embodiment of a combustion cycle that includes engine knock. Again, a y-axis depicts pressure and an x-axis depicts crank angle. Autoignition occurs early at point 212 before a selected ignition time 214 in the graph 210. In one embodiment, system 100 of FIG. 1 can be employed to analyze this combustion cycle, identify the presence of knock with detection system 106, and determine adjustments in ignition timing with adjustment determinator 108. The control unit 104, in this embodiment, can then adjust the ignition timing to occur at about the point 214 in order to reduce engine knock.

Figure 3:
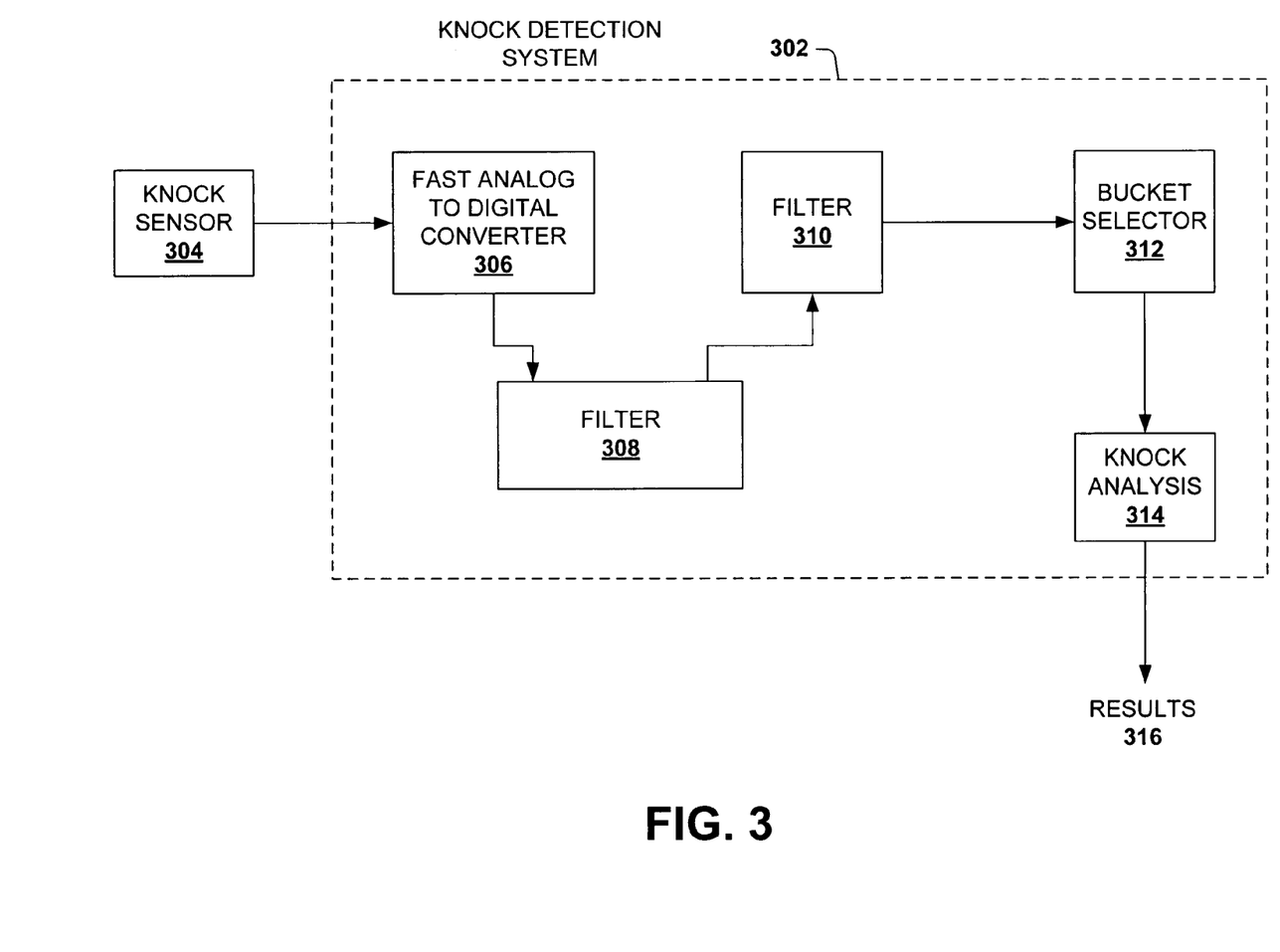
FIG. 3 is a block diagram illustrating a knock detection system in accordance with one embodiment of the invention.

FIG. 3 is a block diagram illustrating a knock detection system 302 in accordance with one embodiment of the invention. In one embodiment, system 302 is fabricated as a single circuit or single integrated circuit. In the illustrated embodiment, system 302 receives a vibration signal from a knock sensor 304 and provides knock analysis results at 316 that indicate the presence of engine knock and/or other knock characteristics. The vibration signal includes vibration components from engine operation that include, but are not limited to, rotations per minute, engine knock and engine noise. In various embodiments, knock sensor 304 can comprise one or more individual sensors mounted, for example, on the engine housing.

In the illustrated embodiment, system 302 includes an analog to digital (A/D) converter 306, a filter 310, a bucket selector 312, and a knock analysis component 314. The A/D converter 306 receives a vibration signal and coverts the signal into digital samples. A/D converter 306 operates at a suitable conversion rate that enables system 302 to perform detection and analysis within a suitable time period. In one embodiment, a suitable A/D converter that can be employed as converter 306 performs a 10 bit conversion in about 0.4 micro-seconds. In the illustrated embodiment, AND converter 306 samples the vibration signal at a suitable sample rate. In one embodiment, the sampling rate is 800 kHz, which provides 800,000 samples per second.

In the illustrated embodiment, filter 308 receives the samples and compresses the samples by applying a suitable compression scheme. In one example, filter 308 employs a moving average filter that compresses the samples by a factor of 8. Filter 308 facilitates performance of the system by reducing the number of samples to be analyzed without a substantial loss of information. In other embodiments, system 302 does not include filter 308.

In the illustrated embodiment, filter 310 analyzes the compressed samples from the compression filter and identifies energies at a range of frequency buckets. In the illustrated embodiment, buckets cover discrete frequency ranges, which generally cover possible spectral frequencies of engine knock. In various embodiments, filter 310 is a digital filter, such as a fast Fourier transform (FFT) filter or a plurality of finite impulse response (FIR) filters. For example, if engine knock for a selected application occurs at 6 kHz and 12 kHz, the frequency buckets are configured to cover both possible engine knock frequency ranges. In another example, there are 10 frequency buckets at 2 kHz wide and starting at 0 kHz and ending at 20 kHz. The energy for each of the buckets can also be converter to a power value in order to facilitate knock detection and analysis.

In the illustrated embodiment, bucket selector 312 selects a subset of the frequency buckets according to operating characteristics of the engine. The subset includes one or more frequency buckets that include expected or possible engine knock spectral components. In various embodiments, bucket selector 312 employs operating characteristics for the engine that can include, but are not limited to, combustion cycle window, cam synchronization, air per cylinder, rotations per minute, engine torque, age of engine, number of cylinders and cylinder size to select the subset of frequency buckets.

In the illustrated embodiment, knock analysis component 314 obtains the selected buckets from bucket selector 312 and analyzes the selected buckets for engine knock analysis. The knock analysis component 314 compares current power values for the selected buckets with previous values to determine a relative power value. This relative power value is then compared with typical engine knock spectral characteristics and power values to identify presence of engine knock. In other embodiments, other suitable approaches can be used to determine a relative power value. In one embodiment, ignition timing adjustments can be determined from the selected buckets. In other embodiments, the analysis results can be provided by knock analysis component 314 for other system components, such as a control unit for an engine.

It is noted that alternate embodiments can be employed to determine and/or analyze other operating characteristics aside from engine knock. The bucket selection and analysis, for example, can be performed in accordance with the other characteristics. Some examples of engine operating parameters and aspects that can be monitored and/or analyzed include cylinder pressure, misfire, bearing & gear vibration analysis, predictive maintenance, clutch grip, and the like.

It is also noted that embodiments of the present invention are not limited to the examples shown above. Other knock detection systems in accordance with the present invention are contemplated that include variations of the above components and additional components not shown or described.

Figure 4:
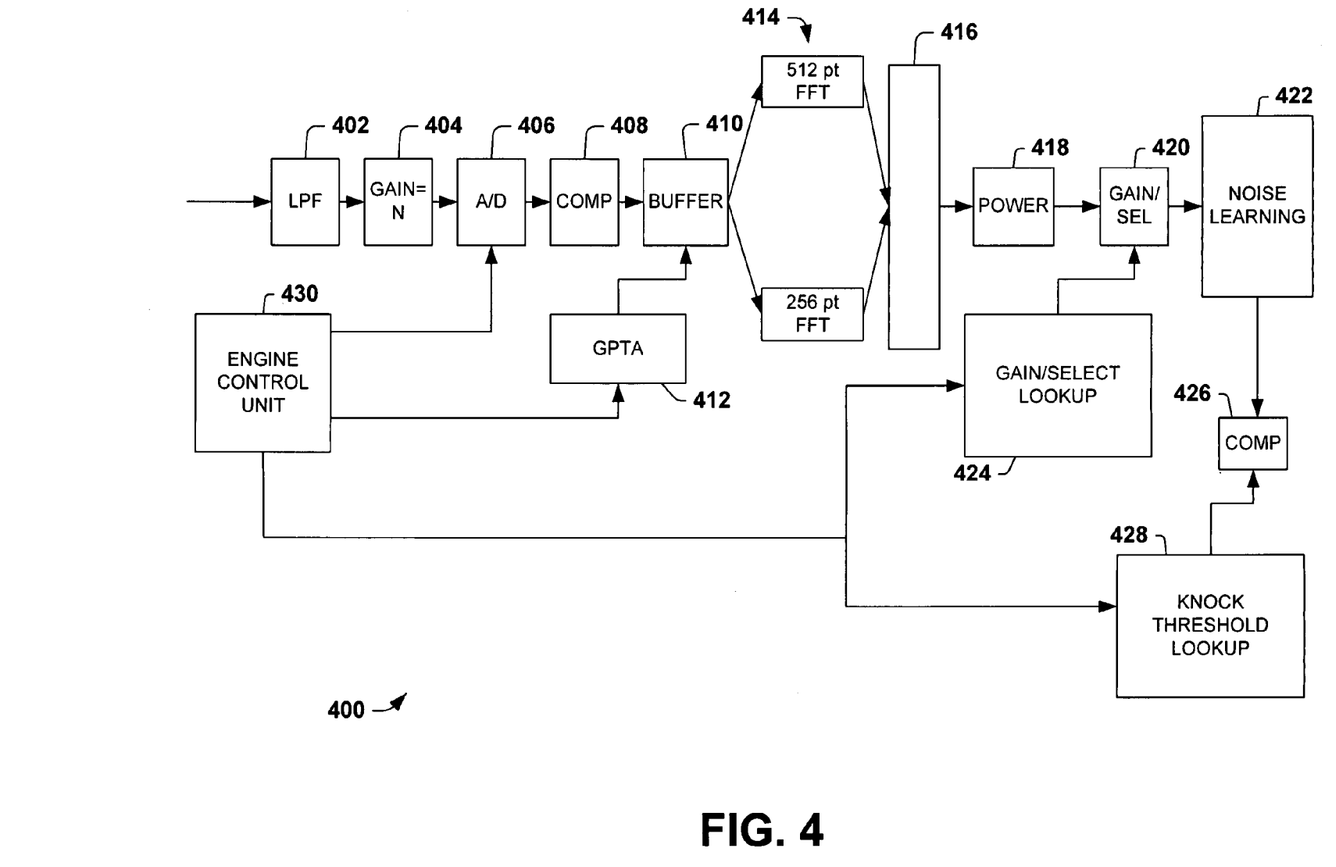
FIG. 4 is a block diagram illustrating a knock detection system in accordance with one embodiment of the invention.

FIG. 4 is a block diagram illustrating a knock detection system 400 in accordance with one embodiment of the invention. The system 400 is provided as an example of an embodiment of the present invention. It is appreciated that some components can be removed and/or additional components added in other embodiments of the invention.

In the illustrated embodiment, system 400 receives a vibration signal from one or more knock sensors or vibration sensors (not shown). The vibration signal is an analog signal that includes vibrations from engine operation, engine knock, noise, and the like.

A low pass filter (LPF) 402 receives the vibration signal and reduces high frequency components from the signal and allows a selected range of low frequency components to pass. Generally, the low pass filter 402 removes higher frequency components that are outside of the typical and/or possible range of engine knock. In one embodiment, the low pass filter 402 can be implemented as a resistor-capacitor circuit. In one embodiment, the low pass filter 402 is configured to remove components above 50 kHz.

In the illustrated embodiment, gain component 404 receives the filtered vibration signal and applies a selected gain to the vibration signal. The gain component 404 can employ a variety of possible gains which are then applied to the vibration signal. The gain is selected according to one or more engine characteristics, such as engine load.

An analog to digital (A/D) converter 406 converts the vibration signal received from the gain component 404 from an analog signal into digital samples. In one embodiment, A/D converter 406 operates at a suitably fast conversion rate, which enables the system 400 to perform detection and analysis within a suitable time period. For example, in one embodiment a suitable A/D converter that can be employed as the converter 406 performs a 10 bit conversion in about 0.4 micro-seconds. In one embodiment, a typical A/D converter employed in automotive applications operate at about 1.3 to 3 micro-seconds which is slower than the A/D converter 406. In the illustrated embodiment, the A/D converter 406 samples the vibration signal at a suitable sample rate. In one embodiment, the sampling rate is 800 kHz, which provides 800,000 samples per second.

In the illustrated embodiment, A/D converter 406 obtains samples during a knock detection window. The knock detection window information is obtained from engine control unit (ECU) 430. The knock detection window is a selected portion of the combustion cycle in which engine knock occurs. In one embodiment, the knock detection window comprises a particular portion of the combustion cycle. In one embodiment, this portion is 20% of the combustion cycle.

In the illustrated embodiment, data compressor component 408 receives the samples from converter 406 and compresses the samples by applying a compression scheme. This compression reduces the number of samples without substantially losing data or information from the samples. In other embodiments, any suitable compression scheme can be employed, such as a moving average filter which compresses the samples by a factor of 8.

In the illustrated embodiment, sample buffer 410 receives the compressed samples from the data compressor component and provides a selected portion of the samples as output from the buffer 410. The samples received by the sample buffer 410 typically cover only the knock detection window cycle in which combustion normally occurs. However, it is appreciated that alternate embodiments of the present invention can include obtaining samples from a greater portion of the combustion cycle and/or the entire combustion cycle. In such embodiments, as an example, the knock detection window information can be employed to control direct memory access (DMA) transfer of samples into the buffer 410 only during the knock detection window.

In the illustrated embodiment, general purpose timer array (GPTA) 412 controls and performs selection of a portion of samples within the buffer 410. The GPTA 412 determines engine rotations per minute (RPM) from a cam synchronization signal. The GPTA 412 determines the engine RPM by measuring a period of the cam synchronization signal.

A Fast Fourier Transform (FFT) filter 414 receives the portion from the buffer 410 and performs filtering on the samples. The filter 414 analyzes the samples and identifies energy values across a range of frequency buckets, in parallel. The buckets cover discrete frequency ranges, which generally cover possible spectral frequencies of engine knock. In one embodiment, if engine knock for a selected application occurs at 6 kHz and 12 kHz, the frequency buckets are configured to cover both possible engine knock frequency ranges. In one embodiment, there are 10 frequency buckets at 2 kHz wide and starting at 0 kHz and ending at 20 kHz.

In the illustrated embodiment, the filter 414 comprises a 512 point FFT and a 256 point FFT. If the number of samples received from buffer 410 is greater than 256, the 512 point FFT is employed and is zero padded. Otherwise, the 256 point FFT is employed and is also zero padded, if less than 256 samples are present. It is noted that alternate embodiments of the invention can employ other filters and/or other configurations of FFT filters.

In the illustrated embodiment, multiplex switch 416 receives the frequency buckets and associated energy values in parallel from the filter 414 and provides a serial stream of the frequency buckets and energy values. A power calculation component 418 receives the buckets and converts the energy values into power values by, for example, squaring the energy values.

A gain select component 420 selects a subset of the frequency buckets and determines gain values for the selected buckets according to operating characteristics by way of a gain/select lookup table 424. The subset includes one or more frequency buckets that include expected or possible engine knock spectral components. The operating characteristics can include, but are not limited to, engine speed or rotations per minute, combustion cycle window, cam synchronization, the amount of air per cylinder, engine torque, engine age, the number of cylinders and the cylinder size. The operating characteristics are stored in the gain/ select lookup table according to frequency and are dynamically updated during operation of the system.

The gain/select lookup table 424 provides a gain value according to one or more of the operating characteristics. The gain value for non selected frequency buckets is typically zero. In one example, the gain value is referenced according to air per cylinder and rotations per minute. The production ECU 430 can provide the current operating characteristics to the gain/select lookup table 424. However, it is appreciated that alternate embodiments of the presenting invention can employ other components to provide the current operating characteristics.

In the illustrated embodiment, noise learning component 422 obtains the selected subset of frequency buckets and analyzes the subset with previously obtained subsets. This analysis yields a variation from previously values that can identify presence of engine knock. Generally, the noise learning component 422 distinguishes changes in operation from engine noise. Relative power values are generated for the selected subset according to their current values and previous values.

A knock threshold lookup table 428 includes threshold values according to operating characteristics for the engine that can include, but are not limited to, engine speed or rotations per minute, combustion cycle window, cam synchronization, the amount of air per cylinder, engine torque, engine age, the number of cylinders and the cylinder size. In one example, the threshold power values are referenced according to air per cylinder and rotations per minute. In the illustrated embodiment, the production ECU 430 can provide the current operating characteristics to the knock threshold lookup table 428. It is appreciated that other configuration for the lookup table can be employed with alternate embodiments.

A compare component 426 compares the relative power values with threshold values from the lookup table 428 and determines the presence or absences of engine knock from the comparison. In one example, the compare component 426 identifies engine knock for power values exceeding the threshold values. The results of the comparison as well as the relative power values, threshold values for the subset of frequency buckets can be provided by the compare component 426.

Figure 5:
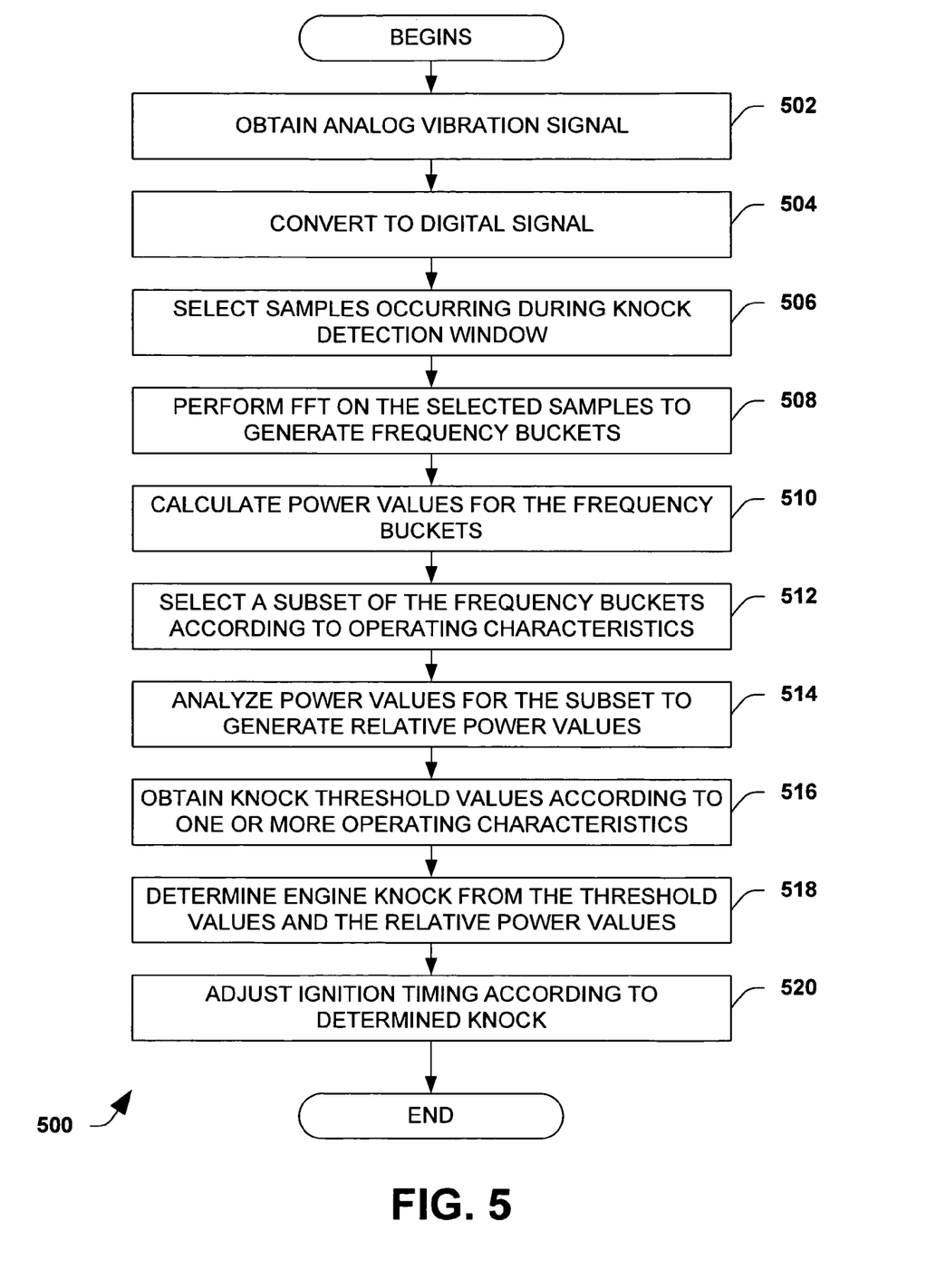
FIG. 5 is a flow diagram illustrating a method of detecting engine knock in accordance with one embodiment of the invention.

FIG. 5 is a flow diagram illustrating a method 500 of detecting engine knock in accordance with one embodiment of the invention. The method 500 employs fast analog to digital conversion and parallel filtering at various frequencies via a FFT filter in order to detect engine knock for combustion engines. The method 500 can be implemented by, for example, one of the above described systems and/or variations thereof. The implementation can be fabricated as in individual circuit or device.

Although the method 500 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods of the present invention may be implemented in association with various types of tire monitoring components and systems, and any such system or group of components, either hardware and/or software, incorporating such a method is contemplated as falling within the scope of the present invention.

The method 500 begins at block 502 wherein a vibration signal, in analog form, is obtained. The vibration signal is an analog signal and is obtained from one or more engine vibration sensors placed at one or more locations on an engine housing. The vibration signal includes vibration components from engine operation and can include, but is not limited to, rotations per minute, engine knock, engine noise, and the like.

The vibration signal is converted from analog into digital samples at block 504. The conversion is performed at a suitably fast conversion rate, which enables engine knock detection and analysis to be performed within a suitable time period. In one embodiment, a conversion process that can be employed is a 10 bit conversion in about 0.4 micro-seconds.

In one embodiment, a typical A/D converter employed in an automotive application operates at about 1.3 to 3 microseconds which is slower than 0.4 microseconds. In one embodiment, the vibration signal is sampled at a suitable sample rate. In one embodiment, the sampling rate is 800 kHz, which provides 800,000 samples per second.

In the illustrated embodiment, a portion of the samples that occur during a knock detection window are selected at block 506. The knock detection window is a portion or time period of the combustion cycle in which engine knock occurs. In one embodiment, engine knock occurs within a window occupying 20 percent of the combustion cycle. In various embodiments, the knock detection window can be determined according to one or more operating characteristics of the engine.

In the illustrated embodiment, the selected portion is filtered at block 508 by performing a Fast Fourier Transform (FFT) filtering on the samples. The FFT transform generates energy values at various frequency buckets in parallel. In one embodiment, an FFT filter, such as the FFT filter 414 as shown in FIG. 4 is employed. In other embodiments, other suitable FFT filters can be employed. In the illustrated embodiment, the buckets cover discrete frequency ranges, which generally cover possible spectral frequencies of engine knock. For example, if engine knock for a selected application occurs at 6 kHz and 12 kHz, the frequency buckets are configured to cover both possible engine knock frequency ranges. In one embodiment, other filters, such as FIR filters, can be used on the selected portion of samples in order to obtain the energy values at the frequency buckets.

In the illustrated embodiment, the energy values for the frequency buckets are converted into power values at block 510. In one embodiment, a power calculator squares the energy values in order to obtain the power values.

In the illustrated embodiment, a subset of the frequency buckets is selected at block 512 according to one or more operating characteristics. In various embodiments, the subset includes one or more frequency buckets that include expected or possible engine knock spectral components. In various embodiments, the one or more characteristics for the engine can include, for example, combustion cycle window, cam synchronization, air per cylinder, rotations per minute, engine torque, age of engine, number of cylinders and cylinder size. In other embodiments, gain values can be applied to the power values of the selected subset of buckets.

In the illustrated embodiment, the power values for the selected subset are analyzed with previous power values to account for noise and generate relative power values for the selected subset at block 514. Knock threshold values are obtained for the selected subset at block 516 according to one or more operating characteristics. The knock threshold values are referenced according to the one or more operating characteristics, typically, from a lookup table. The knock threshold values indicate power values above which engine knock is typically present.

The relative power values are compared with the knock threshold values at block 518 in order to determine presence/absence of engine knock at the selected subset of frequency buckets. The generated comparison can also be employed to perform adjustments in engine operation, such as altering the ignition timing, at block 520.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". Additionally, the term "exemplary" is used to indicate an example and not a best or superior implementation.

What is claimed is:

1. An engine knock detection system comprising:
   a knock sampler component that selects a portion of digital samples according to a knock detection window;
   a fast fourier transform filter that receives the selected portion and identifies energy values across a range of frequency buckets for the selected portion;
   a multiplex switch that receives the energy values across the range of frequency buckets in parallel and provides receives the energy values across the range of frequency buckets as a serial stream;
   a power calculation component calculates power values for the range of frequency buckets;
   a gain/select component selectively applies gains to power values of a subset of the range of frequency buckets according to second one or more operational characteristics;
   a noise learning component receives the subset from the gain/select component and analyzes the power values of the subset with previous power values to determine relative power values for the subset of the range of the frequency buckets; and
   a comparison component that compares the relative power values for the subset with obtained knock threshold values to detect occurrence of engine knock.

2. The system of claim 1, further comprising a gain component that receives an analog vibration signal and applies a gain according to one or more operational characteristics and an analog to digital converter that receives the analog vibration signal from the gain component and converts the analog vibration signal into the digital samples.

3. The system of claim 1, further comprising a sample buffer that receives the digital samples from the compressor and provides the selected portion of the digital samples to the fast fourier transform filter.

4. The system of claim 1, further comprising a compressor filter component that compresses the digital samples according to a compression scheme.

5. The system of claim 1, wherein the one or more operational characteristics comprise engine load.

6. The system of claim 5, wherein the second one or more operational characteristics comprise one or more items selected from the group consisting of air per cylinder, rotations per minute, number of cylinders, and age of engine.

7. The system of claim 1, further comprising a gain/select lookup table that stores gain values according to the second one or more operational characteristics and provides the gain values to the gain/select component.

8. The system of claim 1, further comprising a knock threshold lookup table that stores the knock threshold values according to third one or more operational characteristics and provides the knock threshold values to the comparison component.

9. The system of claim 1, further comprising an engine control unit that provides the one or more operational characteristics and the second one or more operational characteristics and adjusts ignition timing according to the occurrence of engine knock.

10. The system of claim 1, wherein the sample buffer is a 512 point buffer.

11. The system of claim 1, wherein the fast fourier transform filter comprises a 512 point filter and a 256 point filter, wherein the 512 point filter is employed when a number of samples from the sample buffer exceeds 256.

12. The system of claim 1, comprising means for obtaining analysis results and determining adjustments to facilitate engine operation.

13. A detection system comprising:
    means for converting one or more analog signals into one or more digital samples;
    means for analyzing at least a portion of the one or more digital samples and identifies energy values across a range of frequencies;
    means for selecting a subset of the range frequencies for analysis according to one or more operational characteristics; and
    means for analyzing the subset of the range of frequencies along with threshold values to identify one or more results.

14. A detection system comprising:
    an analog to digital converter that converts one or more analog signals into one or more digital samples;
    a filter that analyzes at least a portion of the one or more digital samples and identifies energy values across a range of frequencies;
    a frequency selector that selects a subset of the range of frequencies for analysis according to one or more operational characteristics; and
    an analyzer that analyzes the subset of the range of frequencies along with threshold values to identify one or more results.

15. The system of claim 14, wherein at least one of the one or more results is an identification of engine knock.

16. The system of claim 14, comprising a sensor that provides the analog signal.

17. The system of claim 14, wherein the filter is a fast fourier transform filter.

18. The system of claim 14, wherein the portion of the one or more digital samples occur during a detection window.

19. The system of claim 14, wherein the one or more operational characteristics comprise rotations per minute and air per cylinder.

20. The system of claim 14, wherein the threshold values are associated with measured rotations per minute air per cylinder.

21. The system of claim 14, wherein the threshold values are associated with measured air per cylinder.

22. The system of claim 14, comprising an adjustment determinator that obtains analysis results from the analyzer and determines adjustments to facilitate engine operation.

23. The system of claim 14, further comprising a control unit that alters one or more operations according to the adjustments.

24. A method of detecting results comprising:
 converting one or more analog signals into one or more digital samples;
 analyzing at least a portion of the one or more digital samples to identify energy values across a range of frequencies;
 selecting a subset of the range of frequencies; and
 analyzing the subset to identify one or more results.

25. The method of claim 24, wherein analyzing the portion of the one or more digital samples comprises filtering the portion of the digital samples to generate energy values across a range of frequency buckets.

26. The method of claim 24, further comprising calculating power values across the range of frequencies.

27. The method of claim 24, wherein selecting the subset comprises selecting the subset according to current operating characteristics.

28. The method of claim 24, further comprising calculating power values for the subset and analyzing the power values to identify engine knock.

29. The method of claim 28, further comprising adjusting ignition timing according to the identified engine knock.

30. A method of detecting engine knock comprising:
 converting one or more analog vibration signals into digital samples;
 selecting a portion of the digital samples occurring within a knock detection window;
 performing a fast fourier transform on the selected portion of the digital samples to generate energy values across a range of frequency buckets;
 calculating power values across the range of frequency buckets from the energy values;
 selectively applying gain values to power values of a subset of the frequency buckets according to second current operating characteristics;
 analyzing the power values of the subset with previous power values to determine relative power values for the subset of frequency buckets; and
 comparing the relative power values with threshold values to detect occurrence of engine knock.

31. The method of claim 30, further comprising removing high frequency components from the analog vibration signal prior to converting the analog vibration signal.

32. The method of claim 30, further comprising applying a determined gain to the analog vibration signal prior to converting the analog vibration signal.

33. The method of claim 30, wherein analyzing the power values of the subset with previous power values comprises analyzing with power values from a fixed number of previous combustion cycles.

34. The method of claim 30, further comprising adjusting ignition timing according to the determined engine knock information.

35. The method of claim 30, further comprising determining the knock detection window according to current operational characteristics.

36. The method of claim 30, further comprising obtaining knock threshold values according to third current operating characteristics.

* * * * *

UNITED STATES PATENT AND TRADEMARK OFFICE
CERTIFICATE OF CORRECTION

PATENT NO. : 7,254,475 B1  Page 1 of 1
APPLICATION NO. : 11/348847
DATED : August 7, 2007
INVENTOR(S) : Tim Grai et al.

It is certified that error appears in the above-identified patent and that said Letters Patent is hereby corrected as shown below:

Column 4, Line 7: Please replace the word "AND" with the word --A/D--

Signed and Sealed this

Thirteenth Day of November, 2007

JON W. DUDAS
*Director of the United States Patent and Trademark Office*